United States Patent

Okamoto et al.

[11] Patent Number: 5,519,089
[45] Date of Patent: May 21, 1996

[54] TWO-PACK AQUEOUS COATING COMPOSITION

[75] Inventors: Yoshihiro Okamoto, Hiratsuka; Nobushige Numa, Ebina, both of Japan

[73] Assignee: Kansai Paint Co., Ltd., Hyogo, Japan

[21] Appl. No.: 378,005

[22] Filed: Jan. 25, 1995

[30] Foreign Application Priority Data

Jan. 26, 1994 [JP] Japan .................................. 6-023482

[51] Int. Cl.$^6$ ..................................................... C08F 8/00
[52] U.S. Cl. ............................................ 525/123; 526/279
[58] Field of Search ............................... 525/123; 526/279

[56] References Cited

U.S. PATENT DOCUMENTS

| | | | |
|---|---|---|---|
| 4,711,918 | 12/1987 | Kubitza et al. | 524/196 |
| 5,051,473 | 9/1991 | Tabuchi et al. | 526/279 |
| 5,075,370 | 12/1991 | Kubitza et al. | 524/591 |
| 5,254,631 | 10/1993 | Yamamoto et al. | |
| 5,332,766 | 7/1994 | Takaya et al. | 526/279 |
| 5,338,799 | 8/1994 | Ohsugi et al. | 525/123 |
| 5,346,958 | 9/1994 | Yukawa et al. | 525/123 |

FOREIGN PATENT DOCUMENTS

| | | |
|---|---|---|
| 0358979 | 3/1990 | European Pat. Off. . |
| 4132352 | 4/1992 | Germany . |

*Primary Examiner*—Bernard Lipman
*Attorney, Agent, or Firm*—Wenderoth, Lind & Ponack

[57] ABSTRACT

A two-pack aqueous coating composition which comprises a first pack component composed of alkoxysilane-containing, water-dispersible acrylic copolymer and a second pack component composed of polyisocyanate. Use of this coating composition allows formation of coating films excelling in waterproofness, solvent-resistance, chemical resistance, drying properties, etc., and exhibiting markedly improved physical properties as a paint film such as tensile strength, elongation, etc.

26 Claims, No Drawings

5,519,089

TWO-PACK AQUEOUS COATING COMPOSITION

BACKGROUND OF THE INVENTION

1. Field of the Invention

This invention relates to a two-pack aqueous coating composition comprising a first pack component of water-dispersible acrylic copolymer and a second pack component of polyisocyanate.

2. Description of Related Art

The restriction on any organic solvent release into atmospheric air has been constantly tightened in the recent years, for environmental and sanitary considerations. Paints are no exception and, hence, shifting from organic solvent-dissolved paints to aqueous paints is under progress. In particular, provision of aqueous crosslinking paints is drawing attention because of their favorable weatherability, solvent-resistance and appearance. As compositions meeting the object, aqueous urethane coating compositions have been proposed, the typical examples being two-component polyurethane aqueous paint compositions (cf. U.S. Pat. Nos. 5,075,370 and 4,711,918).

Such two-component polyurethane aqueous paint compositions almost invariably use an aqueous solution, aqueous dispersion or aqueous emulsion of hydroxyl-containing olefinic unsaturated compounds, and are subject to a defect that their initial hardening is slow in the drying during the first through third days after painting, at temperatures not higher than 40° C., in particular, at normal temperature. Also in respect of physical properties, it is difficult to obtain from them a paint film excelling in both tensile strength and elongation. Furthermore, when an emulsifier is used in the process of preparing such a composition, the emulsifier remains in the paint film to deteriorate its water resistance.

SUMMARY OF THE INVENTION

We have engaged in concentrative studies to eliminate the above defects, and we have now found that the above problems can be solved by a two-pack aqueous coating composition comprising a first pack component which is a water-dispersible acrylic copolymer containing specific alkoxysilane groups and a second pack component containing polyisocyanate.

Thus, the present invention provides a two-pack aqueous coating composition comprising:

(A) a first pack component composed of a water-dispersible acrylic copolymer having an acid value of 20–150 and a hydroxyl value of 10–250, which is obtained through copolymerization of 1–90% by weight, based on the total weight of all of the monomers used, of an alkoxysilane-containing vinyl monomer represented by a general formula:

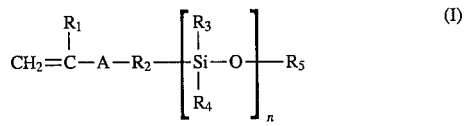

in which A denotes

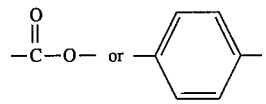

$R_1$ denotes hydrogen atom or methyl group, $R_2$ denotes a divalent aliphatic saturated hydrocarbon group having 1–15 carbon atoms, $R_3$ and $R_4$ each denotes phenyl, an alkyl having 1–6 carbon atoms or alkoxy having 1–10 carbon atoms, $R_5$ denotes an alkyl of 1–10 carbon atoms, and n is an integer of 1–100, with a carboxyl-containing unsaturated monomer, a hydroxyl-containing unsaturated monomer and, if necessary, still other polymerizable monomer or monomers that are copolymerizable with the foregoing, and (B) a second pack component composed of a polyisocyanate containing at least two isocyanate groups, said two packs being used as combined at such a ratio that the hydroxyl groups in the acrylic copolymer (A) and the isocyanate groups in the polyisocyanate (B) are present, in terms of NCO:OH equivalent ratio, in the range of from about 0.2:1 to about 3:1.

Hereinafter the coating composition of the present invention shall be explained in still further details.

DETAILED DESCRIPTION OF THE PREFERRED EMBODIMENT(S)

Acrylic copolymer (A)

The alkoxysilane-containing vinyl monomer represented by the general formula (I) which is an essential constituent of the acrylic copolymer (A), the first pack component, is the monomeric component for imparting self-crosslinking property to said copolymer (A).

Examples of the "$C_1$–$C_{15}$ divalent aliphatic saturated hydrocarbon groups" represented by $R_2$ in said general formula (I) include: straight- or branched-chain alkylene groups such as methylene, ethylene, propylene, 1,2-butylene, 1,3-butylene, tetramethylene, ethylethylene, pentamethylene, hexamethylene, heptamethylene, octamethylene and nonamethylene, those alkylene groups having 1–3 carbon atoms being preferred.

The "alkyl groups having 1 to 6 carbon atoms" represented by $R_3$ and $R_4$ may be straight- or branched-chain in structure. Examples of such alkyl groups include: methyl, ethyl, n-propyl, isopropyl, n-butyl, isobutyl, sec-butyl, tert-butyl, n-pentyl, isopentyl, neopentyl, n-hexyl and isohexyl, those having 1–4 carbon atoms being particularly preferred. The "alkyl groups having 1–10 carbon atoms" which are represented by $R_5$ may again be straight- or branched-chain in structure, specific examples including, besides those named above as examples of alkyl groups having 1–6 carbon groups, n-heptyl, 1-methylpentyl, 2-methylhexyl, n-octyl, n-nonyl and n-decyl. Of those, the alkyl groups having 1 to 4 carbon atoms are preferred.

The "alkoxy groups having 1–10 carbon atoms" represented by $R_3$ and $R_4$ may be straight- or branched-chain in structure, examples of which including methoxy, ethoxy, n-propoxy, isopropoxy, n-butoxy, isobutoxy, sec-butoxy, tert-butoxy, n-pentoxy, isopentoxy, n-hexyloxy, isohexyloxy and n-octyloxy. Of those, the alkoxy groups having 1 to 4 carbon atoms are preferred.

Again referring to the general formula (I), n is an integer of 1–100, preferably 1–50, more preferably 1–10. When n is 2 or more, the plural $R_3$'s and $R_4$'s may be same or different.

As specific examples of the compounds of the general formula (I) in which A is

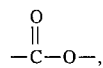

the following may be named:

γ-(meth)acryloxyethyl trimethoxysilane, γ-(meth)acryloxypropyl trimethoxysilane, γ-(meth)acryloxypropyl triethoxysilane, γ-(meth)acryloxypropyl tripropoxysilane, γ-(meth)acryloxypropyl methyldimethoxysilane, γ-(meth)acryloxypropyl methyldiethoxysilane, γ-(meth)acryloxypropyl methyldipropoxysilane, γ-(meth)acryloxybutylphenyl dimethoxysilane, γ-(meth)acryloxy-butylphenyl diethoxysilane, γ-(meth)acryloxy-butylphenyl dipropoxysilane, γ-(meth)acryloxy-propyl dimethylmethoxysilane, γ-(meth)acryloxypropyl dimethylethoxysilane, γ-(meth)acryloxypropylphenyl methylmethoxysilane, γ-(meth)acryloxypropylphenyl methylethoxysilane,

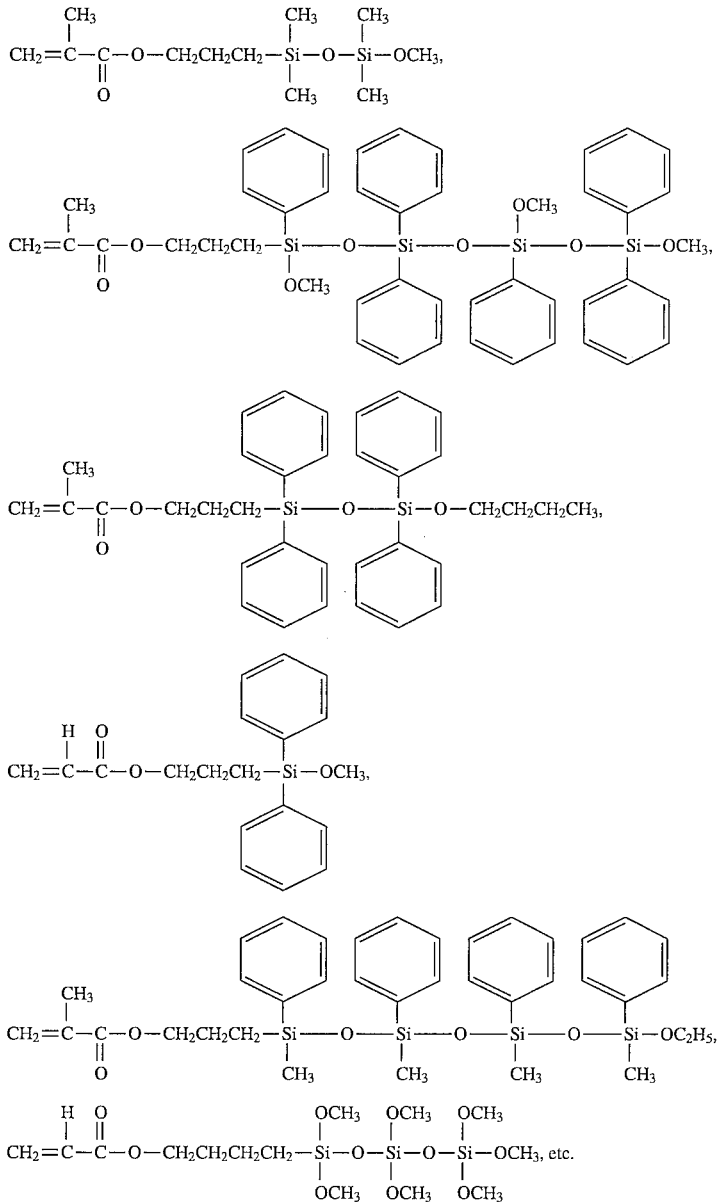

Specific examples of the compounds of general formula (I) in which A is

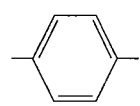

are as follows:

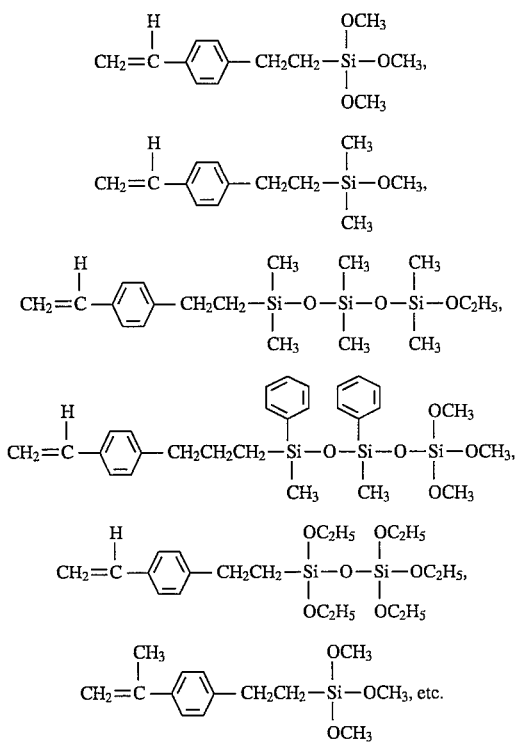

Of those alkoxysilane-containing vinyl monomers of general formula (I), acryloxypropyl trimethoxysilane, methacryloxypropyl trimethoxysilane, methacryloxypropyl triethoxysilane, methacryloxypropyl tri-n-butoxysilane, acryloxypropyl methyldimethoxysilane, methacryloxypropyl methyldimethoxysilane and methacryloxypropylmethyl di-n-butoxysilane are particularly preferred because of their favorable storage stability.

Whereas, the carboxyl-containing unsaturated monomers to be used for preparing the acrylic copolymers (A) are the compounds each containing at least one carboxyl group and one polymerizable unsaturated bond per molecule, preferably one or two carboxyl groups and one polymerizable unsaturated bond per molecule, which are the monomeric component to impart water dispersibility to the copolymer (A) to be formed and to concurrently act as a crosslinking hardening catalyst for the coating film.

As examples of such carboxyl-containing unsaturated monomers, α,β-ethylenically unsaturated carboxylic acids such as (meth)acrylic acid, crotonic acid, maleic acid, maleic anhydride, itaconic acid, itaconic anhydride, fumaric acid, citraconic acid, etc. can be named. Of these, (meth)acrylic acids are particularly preferred.

The hydroxyl-containing unsaturated monomers which are to be used for preparing the acrylic copolymers (A) are the compounds each containing at least one hydroxyl group and at least one polymerizable unsaturated bond per molecule, preferably one or two hydroxyl groups and one polymerizable unsaturated bond. The monomers introduce hydroxyl groups into the copolymers (A), serving to impart to the latter hardenability through the urethane crosslinking reaction with isocyanate groups in polyisocyanate (B).

As such hydroxyl-containing unsaturated monomers, for example, hydroxyalkyl esters having 2–8 carbon atoms of (meth)acrylic acid, e.g., 2-hydroxyethyl (meth)acrylate, 2-hydroxypropyl (meth)acrylate, 3-hydroxypropyl (meth)acrylate, hydroxybutyl (meth)acrylate, etc.; monoethers of polyether polyols such as polyethylene glycol, polypropylene glycol, polybutylene glycol, etc. with hydroxyl-containing unsaturated monomers such as 2-hydroxyethyl (meth)acrylate, etc.; adducts of hydroxyl-containing (meth)acrylic acid ester 1 mol with lactones 1–5 mols [as commercial products, Praccel® FA-1 made by Daicel Chemical Industries, Ltd. of Japan (an addition monomer formed by adding to 1 mol of 2-hydroxyethyl acrylate, 1 mol of ε-caprolactone), Praccel® FM-1, Praccel® FM-3, Praccel® FM-5 (addition monomers formed by adding to 1 mol of 2-hydroxyethyl methacrylate, 1 mol, 3 mols and 5 mols, respectively, of ε-caprolactone), TONE M-100 by Union Carbide Co. of U.S.A. (an addition monomer formed by adding to 1 mol of 2-hydroxyethyl acrylate, 2 mols of ε-caprolactone), etc. are useful]; adducts of α,β-unsaturated carboxylic acids with monoepoxy compounds such as Cardula® E10 (products of Shell Chemical Co.), α-olefin epoxide, etc.; adducts of glycidyl (meth)acrylate with monobasic acids, such as acetic acid, propionic acid, p-t-butylbenzoic acid, caprylic acid, lauric acid, stearic acid, etc.; monoesters or diesters of acid anhydride group-containing unsaturated compounds such as maleic arthydride or itaconic anhydride, with glycols such as ethylene glycol, 1,6-hexamediol, neopentyl glycol, etc.; hydroxyalkyl vinyl ethers such as hydroxyethyl vinyl ether; hydroxyl-containing monomers containing chlorine such as 3-chloro-2-hydroxypropyl (meth)acrylate; allyl alcohol, etc. can be named. Of these, $C_2$–$C_8$ in particular, $C_2$–$C_4$ hydroxyalkyl esters of (meth)acrylic acid, such as 2-hydroxyethyl (meth)acrylate, 2-hydroxypropyl (meth)acrylate, 3-hydroxypropyl (meth)acrylate, hydroxybutyl (meth)acrylate, etc. are particularly preferred.

The acrylic copolymer (A) used in the present invention is obtained by copolymerizing at least one of the alkoxysilane-containing vinyl monomers represented by the general formula (I), at least one of the carboxyl-containing unsaturated monomers and at least one of the hydroxyl-containing unsaturated monomers as the essential monomeric components, optionally with still other polymerizable monomer or monomers which are copolymerizable with those essential components.

The use ratio of these monomers can be selected from a wide range depending on kinds of the monomers, intended utility of each final coating composition, etc. while normally the following ranges are adequate. The monomeric component represented by general formula (I) may be used in an amount of 1–90 wt %, preferably 3–50 wt %, more preferably 5–35 wt %, based on the total monomers used. When its ratio is less than 1 wt %, hardenability of the paint film or tensile strength and elongation, etc. of the resultant coating film are decreased. Whereas, when it exceeds 90 wt %, storage stability of the copolymer before it is made aqueous is degraded. The carboxyl group-containing unsaturated monomeric component can be used at such a ratio that the acid value, based on the carboxyl groups whereby introduced, of the acrylic copolymer (A) falls in the range of 20–150, preferably about 40–120, more preferably 75–115. When the formed acrylic copolymer (A) has an acid value less than 20, it generally exhibits poor water dispersibility. Whereas, when the acid value exceeds 150, eventually formed coating film comes to exhibit poor water resistance. The hydroxyl-containing unsaturated monomeric component can be used at such a ratio that the hydroxyl value, based on the hydroxyl groups whereby introduced, of the acrylic copolymer (A) falls in the range of 10–250, preferably 15–150, more preferably 20–130. When the formed acrylic copolymer (A) has a hydroxyl value less than 10, normally hardenability of the copolymer or tensile strength of the coating film formed from the composition are impaired. Whereas, when the hydroxyl value exceeds about 250, the coating film exhibits decreased elongation, etc. and, therefore, is objectionable.

The use ratio of other polymerizable monomers which may be used if necessary can be suitably selected from the range of 95–0 wt %, preferably 85–30 wt %, more preferably 80–50 wt %, based on the total sum of all monomers used, depending on the performance required of individual coating film.

As such other polymerizable monomers optionally used for making the acrylic copolymer (A), radical-polymerizable unsaturated monomers are preferred. Examples of such monomers include: (meth)acrylic acid esters such as $C_1$–$C_{18}$ alkyl esters or cycloalkyl esters, e.g., methyl (meth)acrylate, ethyl (meth)acrylate, propyl (meth)acrylate, n-butyl (meth)acrylate, isobutyl (meth)acrylate, tert-butyl (meth)acrylate, 2-ethylhexyl (meth)acrylate, cyclohexyl (meth)acrylate, n-octyl (meth)acrylate, lauryl (meth)acrylate, tridecyl (meth)acrylate, stearyl (meth)acrylate, etc. and $C_2$–$C_{18}$ alkoxyalkyl esters, e.g., methoxybutyl (meth)acrylate, methoxyethyl (meth)acrylate, ethoxybutyl (meth)acrylate, etc.; vinylethers and allylethers including straight chain alkyl vinylethers such as ethyl vinylether, n-propyl vinylether, isopropyl vinylether, butyl vinylether, tert-butyl vinylether, pentyl vinylether, hexyl vinylether, octyl vinylether, etc., cycloalkyl vinylethers such as cyclopentyl vinylether, cyclohexyl vinylether, etc., aryl vinylethers such as phenyl vinylether, trivinyl phenylether, etc., aralkyl vinylethers such as benzyl vinylether, phenethyl vinylether, etc., and allylethers such as allylglycidylether, allylethylether, etc.; vinyl esters and propenyl esters including vinyl esters, e.g., vinyl acetate, vinyl propionate, vinyl lactate, vinyl butyrate, vinyl isobutyrate, vinyl caproate, vinyl isocaproate, vinyl pivalate, vinyl caprate, Veova Monomer® (product of Shell Chemical Co.), etc. and propenyl esters, e.g., isopropenyl acetate, isopropenyl propionate, etc.; olefinic compounds such as ethylene, propylene, butylene, vinyl chloride, etc.; diene compounds such as butadiene, isoprene, chloroprene, etc.; and vinyl aromatic compounds such as styrene, α-methylstyrene, vinyltoluene, α-chlorostyrene, etc.; and fluorine monomer such as perfluoromethylmethyl acrylate, perfluoromethylmethyl methacrylate, perfluoropropylmethyl acrylate, perfluoropropylmethyl methacrylate, perfluoropropylpropyl acrylate, perfluoropropylpropyl methacrylate, perfluorooctylundecyl acrylate, perfluorooctylundecyl methacrylate, perfluoroisononylmethyl acrylate, perfluoroisononylmethyl methacrylate, 2-perfluorooctylethyl acrylate, 2-perfluorooctylethyl methacrylate, 2-perfluoroisononylethyl acrylate, 2-perfluoroisononylethyl methacrylate, tetrafluoroethylene, chlorotrifluoroethylene, vinyl fluoride, vinylidene fluoride, etc.

Preferred acrylic copolymers (A) are obtained through solution polymerization of above-named monomers of adequate combination, normally in the presence of a radical polymerization initiator.

As examples of the radical polymerization initiator which are useful in the solution polymerization, peroxides such as benzoyl peroxide, di-t-butyl hydroperoxide, t-butyl hydroperoxide, cumyl peroxide, cumene hydroperoxide, diisopropylbenzene hydroperoxide, t-butyl peroxybenzoate, lauryl peroxide, acetyl peroxide, t-butyl peroxy-2-ethylhexanoate, etc.; and azo compounds such as α,α'-azobisisobutyronitrile, azobisdimethylvarelonitrile, azobiscyclohexanecarbonitrile, etc. can be named. These polymerization initiators can normally be used in an amount ranging from about 0.2–20 parts by weight, preferably 1.5–10 parts by weight, per 100 parts by weight of the total monomers put to the polymerization.

The polymerization can be performed by any method known per se. The adequate reaction temperature for the polymerization normally ranges from about 60°–about 160° C. The reaction can normally be completed in about 1–15 hours.

The acrylic copolymers (A) that are suitable for use in the present invention normally have a number-average molecular weight in the range of from about 1,000 to about 60,000 (corresponding to weight-average molecular weight of from about 3,000 to about 200,000), in particular, from about 1,000 to about 30,000. When the copolymer has a number-average molecular weight of less than about 1,000, the eventually formed paint film tends to exhibit decreased hardenability and durability. Whereas, when it has a number-average molecular weight exceeding about 60,000, the resultant aqueous dispersion comes to have a high viscosity and may become difficult of handling.

The organic liquids to be used in above solution polymerization need to be capable of dissolving the copolymers before they are made water-dispersible. Examples of useful organic liquid include: alcoholic solvents, such as n-propanol, isopropanol, n-butanol, t-butyl alcohol, isobutyl alcohol, pentanol, 2-methyl-1-butanol, isopentyl alcohol, neopentyl alcohol, hexanol, heptanol, octanol, allyl alcohol, benzyl alcohol, cyclohexanol, 1,2-ethanediol, 1,2-propanediol, 1,2-butanediol, 1,5-pentanediol, glycerine, etc.; and ethereal solvents such as dibutyl ether, ethyl vinylether, methoxytoluene, diphenyl ether, dioxane, propylene oxide, acetal, glycerine ether, tetrahydrofuran, 1,2-dimethoxyethane, cellosolve, methyl cellosolve, butyl cellosolve, methyl carbitol, 2-methoxyethanol, 2-ethoxyethanol, 2-butoxyethanol, diethylene glycol, diethylene glycol monoethyl ether, diethylene glycol monobutyl ether, triethylene glycol monomethyl ether, 1-methoxy-2-propanol, dipropylene glycol monomethyl ether, etc. These organic liquids can be used each singly or as mixtures of more than one liquid.

So formed acrylic copolymers (A) can be formed into aqueous dispersions, which can be accomplished by, for example, at least partially neutralizing a copolymer (A) with a basic substance and then adding an aqueous medium, e.g., water, thereto; or by adding a copolymer (A) which has been at least partially neutralized to an aqueous medium, preferably water. In the former method of adding an aqueous medium to the neutralization product, for example, a neutralizing agent is added within the shortest time possible to the copolymer (A) obtained upon solution polymerization under agitation, to effect the neutralization, and it is preferred to add thereto an aqueous medium immediately thereafter to accomplish the phase change from an organic solvent system to aqueous system, in order to prevent gelation. After the phase change, the remaining aqueous medium is slowly added dropwise to the system, until the solid content required in the occasion is reached. In this neutralization and conversion to aqueous system procedure, upon addition of a neutralizing agent to a copolymer (A), hydrolysis and condensation reaction of alkoxysilane groups in the copolymer rapidly progresses, which is apt to invite viscosity increase and gelation. In order to prevent it, it is preferred to carry out the neutralization and addition of aqueous medium within a short time. More specifically, appropriate addition time for the aqueous medium in said neutralization and phase change procedure is generally within 24 hours, preferably within 10 hours, while it varies depending on the reaction vessel, agitating conditions, ambient temperature, etc. which are employed for individual occasions.

Whereas, the latter method of adding the neutralized product to aqueous medium can be carried out by adding a neutralizing agent to a copolymer (A) within a short time under agitation, and adding the resultant neutralized product slowly to an aqueous medium with stirring, to disperse the former in the latter. In order to prevent possible viscosity increase and gelation of the neutralized product before it is added to the aqueous medium, it is desirable to disperse it in the medium within the shortest time possible. Generally it is convenient, therefore, that the time between the neutralization and the addition to an aqueous medium is within 24 hours, preferably within 10 hours.

In a preferred method for converting a copolymer (A) to aqueous dispersion without causing viscosity increase or gelation, water is added to the copolymer before the latter's neutralization, to effect the phase change to aqueous system which is then neutralized at least partially with a basic substance and formed into an aqueous dispersion. For example, to the copolymer obtained upon the solution polymerization water is added with stirring until the phase change to an aqueous system is achieved, and then a neutralizing agent is added to the system to form an aqueous dispersion. According to this method the basic substance (neutralizing agent), which acts also as a hydrolyzing catalyst and accelerates crosslinkage, is blended after the copolymer (A) has been dispersed in water, allowing stable presence of silanol groups, etc., to effectively prevent viscosity increase and gelation of the copolymer. Thus, the method is particularly advantageous for making high concentration aqueous dispersions. Furthermore, aqueous dispersions obtained by this method are preferred in the point that they have a large number of silanol groups on the surface and excel in crosslinking ability.

Appropriate temperatures for forming aqueous dispersions of the copolymers by above-described methods normally range from about 1° to about 90° C., preferably from about 5° to about 50° C. When the temperature is below about 1° C., the system tends to have a high viscosity and the dispersed particles tend to have large diameters. Whereas, when it exceeds about 90° C., the alkoxysilane groups are rapidly hydrolized to form silanol groups, which are apt to react mutually to cause viscosity increase and gelation.

Examples of the basic substances (neutralizing agent) useful for rendering the copolymers water-dispersible include: ammonia; primary monoamines such as ethylamine, propylamine, butylamine, benzylamine, monoethanolamine, neopentanolamine, 2-aminopropanol, 3-aminopropanol, etc.; secondary monoamines such as diethylamine, diethanolamine, di-n- or di-iso-propanolamine, N-methylethanolamine, N-ethylethanolamine, etc.; and tertiary monoamines such as dimethylethanolamine, trimethylamine, triethylamine, triisopropylamine, methyldiethanolamine, dimethylaminoethanol, etc. Of these, particularly ammonia and triethylamine are preferred, because they exhibit little toxicity, have little tendency to remain in the coating film when the formed aqueous dispersions are dried at normal temperature and used in the coating composition, and give paint film of excellent performance.

Such a basic substance can be used in an amount ranging from 0.1–1.5 equivalents, preferably about 0.2–about 1 equivalent, to the free carboxyl groups contained in the copolymer used. When its amount is less than about 0.1 equivalent, it is generally difficult to render the copolymer water-dispersible or, even if an aqueous dispersion could be formed, the dispersion frequently exhibits poor storage stability. Whereas, when the amount of the basic substance is more than about 1.5 equivalents, free basic substance in the resulting dispersion increases to impair storage stability of the product.

Thus obtained aqueous dispersion of the acrylic copolymer (A) can be used as the first pack of the two-pack aqueous coating composition of the present invention, either as it is or, if necessary, the organic liquid contained in the aqueous dispersion may first be distilled off at atmospheric or reduced pressure to reduce the organic liquid content to less than about 10% by weight to the water content of the dispersion, before the dispersion is used as the first pack. Such an additional processing can improve storage stability of the aqueous dispersion and is advantageous for preventing atmospheric pollution.

It is desirable to adjust the resin solid concentration in the aqueous dispersions of acrylic copolymer (A), generally to about 1–about 70% by weight, preferably from about 5–about 50% by weight. The concentration less than about 1% by weight is economically disadvantageous for forming thick coating film. Whereas, when the concentration exceeds about 70% by weight, there is a fear that the copolymer particles aggregate and settle, or the aqueous dispersion comes to have an increased viscosity and gel. The average particle diameter of dispersed copolymer in the aqueous dispersion is conveniently in the range of from about 0.01 to about 1 μm, in particular, from about 0.02 to about 0.6 μm.

Polyisocyanate (B)

Polyisocyanate (B) to be used as the second pack component according to the present invention is a compound containing at least 2, preferably 2–3, isocyanate groups per molecule. Generally such polyisocyanate compounds which are liquid at normal temperature and, in particular, free from yellowing tendency, are preferred for good weatherability. Examples of such compounds are aliphatic diisocyanates such as hexamethylene diisocyanate, trimethylhexamethylene diisocyanate, etc.; ring-containing aliphatic diisocyanates such as xylylene diisocyanate, isophorone diisocyanate; or terminal isocyanate-containing compounds which are obtained upon reacting an excess amount of these polyisocyanate compounds with low molecular weight, active hydrogen-containing compounds such as water, ethylene glycol, propylene glycol, trimethylolpropane, hexanetriol, castor oil, etc.; biuret-type adducts of these polyisocyanate compounds; and isocyanuric ring-type adducts of these polyisocyanate compounds, etc. Furthermore, water-dispersible isocyanate compounds formed by coating isocyanate group-containing compounds with aqueous resins. Those polyisocyanate compounds may be used either singly or as a mixture of more than one compounds. Of those, biuret-type adduct of hexamethylene diisocyanate and isocyanuric ring-type adduct of hexamethylene diisocyanate are preferred.

It is permissible to add an organic liquid to those polyisocyanate compounds, if necessary, to improve their miscibility with aforesaid acrylic copolymer (A). Examples of preferred organic liquid for that purpose include: alcoholic solvents such as n-propanol, isopropanol, n-butanol, t-butyl alcohol, isobutyl alcohol, pentanol, 2-methyl-1-butanol, isopentyl alcohol, neopentyl alcohol, hexanol, heptanol, octanol, allyl alcohol, benzyl alcohol, cyclohexanol, 1,2-ethanediol, 1,2-propanediol, 1,2-butanediol, 1,5-pentanediol, glycerine, etc.; ethereal solvents such as dibutyl ether, ethyl vinyl ether, methoxytoluene, diphenyl ether, dioxane, propylene oxide, acetal, glycerine ether, tetrahydrofuran, 1,2-dimethoxyethane, cellosolve, methyl cellosolve, butyl cellosolve, methyl carbitol, 2-methoxyethanol, 2-ethoxyethanol, 2-butoxyethanol, diethylene glycol, diethylene glycol monoethyl ether, diethylene glycol monobutyl ether, triethylene glycol monomethyl ether, 1-methoxy-2-propanol, dipropylene glycol monomethyl ether, etc.; and ester solvents such as methyl acetate, ethyl acetate, propyl acetate, butyl acetate, isobutyl acetate, pentyl acetate, 3-methoxybutyl acetate, 2-ethylhexyl acetate, benzyl acetate, cyclohexyl acetate, methyl propionate, ethyl propionate, sebacic acid ester, phthalic acid ester, ethylene glycol monoacetate, propylene glycol monomethyl ether acetate, ethylene diacetate, cellosolve acetate, carbitol acetate, ethyl acetoacetate, etc. The amount of the organic liquid to be used is normally from about 0 to about 40% by weight, preferably from about 0 to about 25% by weight, more preferably from about 0 to 15% by weight, based on the sum of the polyisocyanate compound and the organic liquid.

The aqueous coating composition of the present invention is composed of a combination of a first pack consisting essentially of an aqueous dispersion of said acrylic copolymer (A) and a second pack consisting essentially of said polyisocyanate compound (B). The polyisocyanate compound (B) may be used at such ratios that the hydroxyl groups in the acrylic copolymer (A) to the isocyanate groups in the polyisocyanate compound becomes about 0.2:1 to about 3:1, preferably from 0.5:1 to 2:1, still more preferably 0.8:1 to 1.5:1, in terms of NCO:OH equivalent ratio.

Above-described aqueous dispersion of acrylic copolymer (A) as the first pack component and polyisocyanate (B) as the second pack component can be used as the chief components of the two-pack aqueous coating composition of the present invention, as mixed at the time of use.

The two-pack aqueous coating composition of the present invention is conveniently used, for example, as paint, adhesive, ink, surface-treating agent and the like.

While it is possible to use the two-pack aqueous coating composition of the present invention as in the above-described forms, if necessary such additives as extenders, coloring pigments, metallic pigments, dyes, thickeners, curing catalyst, ultraviolet absorbers, antioxidants, anti-algae agents, antimolding agents, sterilizers, defoaming agents, etc. may be added to either the aqueous dispersion of acrylic copolymer (A) or the solution of polyisocyanate (B), or at the mixing time of the two.

The two-pack aqueous coating composition of the present invention can be applied, when it is used as a paint, onto various materials by such means as, for example, spraying, roller-coating, brushing, dipping or the like. The application amount is subject to no critical limitation, while it is normally adequate to apply, in terms of the film thickness, in about 1 to 1,000 μm. The paint film can be dried at normal temperature, but if necessary the drying can be effected under heating, at temperatures up to about 200° C.

The two-pack aqueous coating composition of the present invention can form a coating film which exhibits excellent waterproofness, solvent resistance, chemical resistance, drying property, etc., as well as markedly improved paint film characteristics (tensile strength, elongation, etc.).

That is, coating films formed by two-pack aqueous coating composition of the present invention have siloxane bonds which are chemically stable to water, basic substances, acidic substances, etc., and are self-crosslinked. Furthermore, as the films contain the water-dispersible acrylic copolymer containing silanol groups and hence excelling in crosslinkability, it exhibits even better drying property than that of coating films formed upon urethane crosslinkage alone. Thus, coating films of drastically improved physical properties can be formed.

Hereinafter the invention is more specifically explained with reference to working examples and comparative examples, it being understood that the invention is in no sense thereby limited. In the examples, parts and percentages are by weight, unless otherwise specified.

Production Example 1 of Water-dispersible Acrylic Copolymer

A four-necked flask equipped with a thermometer, stirrer, condenser and dropping funnel was charged with 100 parts of isopropyl alcohol, into which the following monomers and polymerization initiator were added dropwise over 3 hours under reflux. After completion of the addition, the content of the flask was aged for 2 hours:

| | |
|---|---|
| γ-methacryloxypropyl trimethoxysilane | 10 parts |
| 2-hydroxyethyl acrylate | 15 parts |
| acrylic acid | 10 parts |
| n-butyl methacrylate | 32 parts |
| methyl methacrylate | 25 parts |
| styrene | 8 parts |
| azobisisobutyronitrile | 4 parts |

The resultant product liquid was transparent, contained 50% of non-volatile component and had a Gardner viscosity (25° C.) of 0. This polymer had an acid value of 77.9 and a hydroxyl value of 72.5.

The liquid was cooled to 30° C. or below, added with 233 parts of water, and was changed to aqueous phase as neutralized with 0.8 equivalent of triethylamine under stirring, which required 10 minutes. Then isopropyl alcohol was removed under reduced pressure, to provide an aqueous dispersion free of any organic liquid. The aqueous dispersion contained 31% of non-volatile component and had a Gardner viscosity (25° C.) of A.

Production Examples 2–7 of Water-Dispersible Acrylic Copolymers

Water-dispersible acrylic copolymers were prepared in the manner similar to above Production Example 1, from the monomeric blends and polymerization initiators as indicated in Table 1 below.

TABLE 1

| | Sample Name Production Example No. of Water-Dispersible Acrylic Copolymer | | | | | |
|---|---|---|---|---|---|---|
| Starting Material | 2 | 3 | 4 | 5 | 6 | 7 |
| γ-methacryloxypropyl trimethoxysilane | 3.0 | 30.0 | 15.0 | 20.0 | — | — |
| γ-methacryloxypropyl methyldimethoxysilane | — | — | — | — | 10.0 | — |
| acrylic acid | 7.0 | — | — | 15.0 | 10.0 | 7.0 |
| methacrylic acid | — | 13.0 | 7.0 | — | — | — |

TABLE 1-continued

| Starting Material | | Sample Name Production Example No. of Water-Dispersible Acrylic Copolymer | | | | | |
|---|---|---|---|---|---|---|---|
| | | 2 | 3 | 4 | 5 | 6 | 7 |
| 2-hydroxyethyl acrylate | | — | 5.0 | 30.0 | 10.0 | 115.0 | 20.0 |
| 2-hydroxyethyl methacrylate | | 20.0 | — | — | — | — | — |
| n-butyl methacrylate | | 30.0 | 32.0 | — | 16.0 | 32.0 | 24.0 |
| methyl methacrylate | | — | — | 33.0 | — | 25.0 | 36.0 |
| ethyl methacrylate | | 30.0 | 10.0 | — | 29.0 | — | — |
| styrene | | 10.0 | 10.0 | 15.0 | 10.0 | 8.0 | 13.0 |
| α,α-azobisisobutyronitrile | | — | — | 2.5 | 5.0 | 4.0 | 4.0 |
| azobisdimethylvarelonitrile | | 3.0 | 5.0 | — | — | — | — |
| acrlyic copolymer | acid value | 54.5 | 84.8 | 45.7 | 116.9 | 77.9 | 54.5 |
| | hydroxyl value | 86.3 | 24.2 | 145.1 | 48.4 | 72.5 | 96.7 |
| | viscosity | N | R | U | N | K | J |
| water-dispersible acrylic copolymer | viscosity | A | B | D | A | A | A1 |

EXAMPLE 1

Immediately before painting, the water-dispersible acrylic copolymer of Production Example 1 and SUMIDUR® N-3500 (a commercial product by Sumitomo Bayer Urethane Co., Ltd.: an isocyanurate type hexamethylene diisocyanate of non-volatile content 100% and NCO content 21.6%), whose non-volatile content had been adjusted to 70% with propylene glycol monomethyl ether acetate, were mixed at 1:1 in terms of NCO:OH equivalent ratio, stirred in an agitator, and the resultant two-pack aqueous coating composition was tested of its performance as described later.

EXAMPLE 2

A two-pack aqueous coating composition was prepared of identical formulation with the one employed in Example 1, except that the water-dispersible acrylic copolymer of Production Example 1 was replaced by that of Production Example 2. Performance of the composition was tested as described later.

EXAMPLE 3

A two-pack aqueous coating composition was prepared of identical formulation with the one employed in Example 1, except that the water-dispersible acrylic copolymer of Production Example 1 was replaced by that of Production Example 3. Performance of the composition was tested as described later.

EXAMPLE 4

The water-dispersible acrylic copolymer formed in Production Example 4 was mixed with DURANATE® 24A-90CX (a commercial product of Asahi Chemical Industry Co., Ltd.: a biuret type hexamethylene diisocyanate of non-volatile content 90% and NCO content 21.2%), whose non-volatile content had been adjusted to 70% with propylene glycol monomethyl ether acetate, at 1:1 in terms of NCO:OH equivalent ratio. The mixture was stirred with an agitator, and the resultant two-pack aqueous coating composition was tested of its performance as described later.

EXAMPLE 5

A two-pack aqueous coating composition was prepared of identical formulation as in Example 4, except that the water-dispersible acrylic copolymer of Production Example 4 was replaced by that of Production Example 5. The composition then was tested of its performance as described later.

EXAMPLE 6

A two-pack aqueous coating composition was prepared of identical formulation as in Example 7, except that the water-dispersible acrylic copolymer of Production Example 1 was replaced by that of Production Example 6. The composition was then tested of its performance as described later.

COMPARATIVE EXAMPLE 1

A two-pack aqueous coating composition was prepared of identical formulation as in Example 1, except that the water-dispersible acrylic copolymer of Example 1 was replaced by that of Production Example 7. The composition was then subjected to the performance tests as described later.

COMPARATIVE EXAMPLE 2

The water-dispersible acrylic copolymer of Example 1 was subjected to the same performance tests as it was, as an aqueous coating composition.

The tests of those coating compositions obtained in the foregoing Examples and Comparative Examples were conducted in the following manner.

Gel Fraction

Each sample composition was applied onto glass sheets, and dried for a day and seven (7) days, respectively, at 30° C. The coating films separated from the glass sheets were placed in acetone which was maintained at reflux temperature and extracted 5 hours, to determine the residual ratios (%) of remaining insoluble paint film.

Tensile Test

Each sample composition was applied onto a glass sheet with a 200 μm applicator and dried for 30 days at 30° C. to provide a 20 mm×5 mm separated film. The film was drawn with a tensile tester to be determined of its tensile strength and elongation.

Painted Surface Condition

Each painted surface was visually observed to examine abnormalities in appearance, etc.

The test results were as indicated in Table 2 below.

TABLE 2

| Item | | Example 1 | 2 | 3 | 4 | 5 | 6 | Comparative Example 1 | 2 |
|---|---|---|---|---|---|---|---|---|---|
| Painted surface condition | | good | good | good | good | good | good | good | shrinking |
| Gel fraction (%) | after a day's drying | 89 | 88 | 92 | 90 | 91 | 89 | 82 | 71 |
| | after 7 days' drying | 92 | 91 | 94 | 94 | 94 | 92 | 87 | 75 |
| Tensile test | tensile strength (Kg/cm$^2$) | 150 | 130 | 180 | 170 | 170 | 150 | 170 | 80 |
| | elongation (%) | 30 | 28 | 32 | 31 | 30 | 33 | 5 | 1 |

What is claimed is:

1. A two-pack coating composition comprising:

(A) a first pack component comprising a water-dispersible acrylic copolymer having an acid value of 20–150 and a hydroxyl value of 10–250, which copolymer comprises (1) 1–90% by weight, based on the total weight of all monomers in said copolymer, of at least one alkoxysilane-containing vinyl monomer represented by the formula (I):

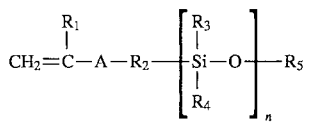

in which A denotes

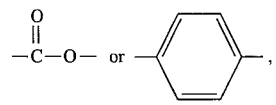

$R_1$ denotes hydrogen atom or methyl group, $R_2$ denotes a divalent aliphatic saturated hydrocarbon group having 1–15 carbon atoms, $R_3$ and $R_4$ each denotes phenyl, alkyl having 1–6 carbon atoms or alkoxy having 1–10 carbon atoms, $R_5$ denotes an alkyl of 1–10 carbon atoms, and n is an integer of 1–100, with (2) at least one carboxyl-containing unsaturated monomer, and (3) and at least one hydroxyl-containing unsaturated monomer, and (B) the second pack component comprising a polyisocyanate containing at least two isocyanate groups.

2. A composition as defined in claim 1, in which the alkoxysilane-containing vinyl monomer is a compound of said formula (I) wherein $R_1$ is hydrogen atom or methyl group; $R_2$ is a $C_1$–$C_3$ alkylene group; $R_3$ and $R_4$ are each a member of the group consisting of phenyl, $C_1$–$C_4$ alkyl and $C_1$–$C_4$ alkoxy; $R_5$ is a $C_1$–$C_4$ alkyl and n is an integer of 1–50.

3. A composition of claim 1 in which the alkoxy-containing vinyl monomer is selected from the group consisting of γ-(meth)acryloxyethyl trimethoxysilane, γ-(meth)acryloxypropyl trimethoxysilane, γ-(meth)acryloxypropyl triethoxysilane, γ-(meth)acryloxypropyl tripropoxysilane, γ-(meth)acryloxypropyl methyldimethoxysilane, γ-(meth)acryloxypropyl methyldiethoxysilane, γ-(meth)acryloxypropyl methyldipropoxysilane, γ-(meth)acryloxy-butylphenyl dimethoxysilane, γ-(meth)acryloxy-butylphenyl diethoxysilane, γ-(meth)acryloxy-butylphenyl dipropoxysilane, γ-(meth)acryloxy-propyl dimethylmethoxysilane, γ-(meth)acryloxy-propyl dimethylethoxysilane, γ-(meth)acryloxy-propylphenyl methylmethoxysilane, γ-(meth)acryloxy-propylphenyl methylethoxysilane,

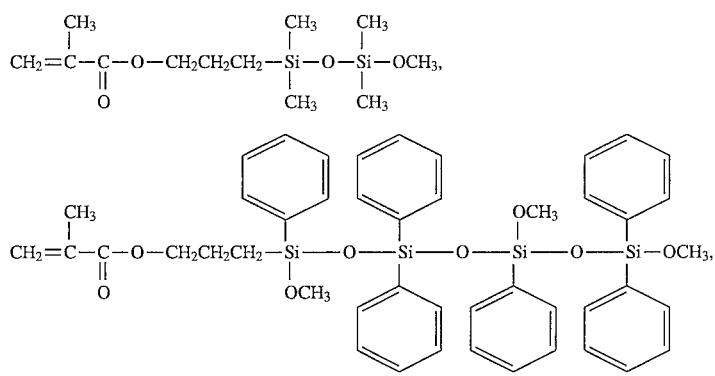

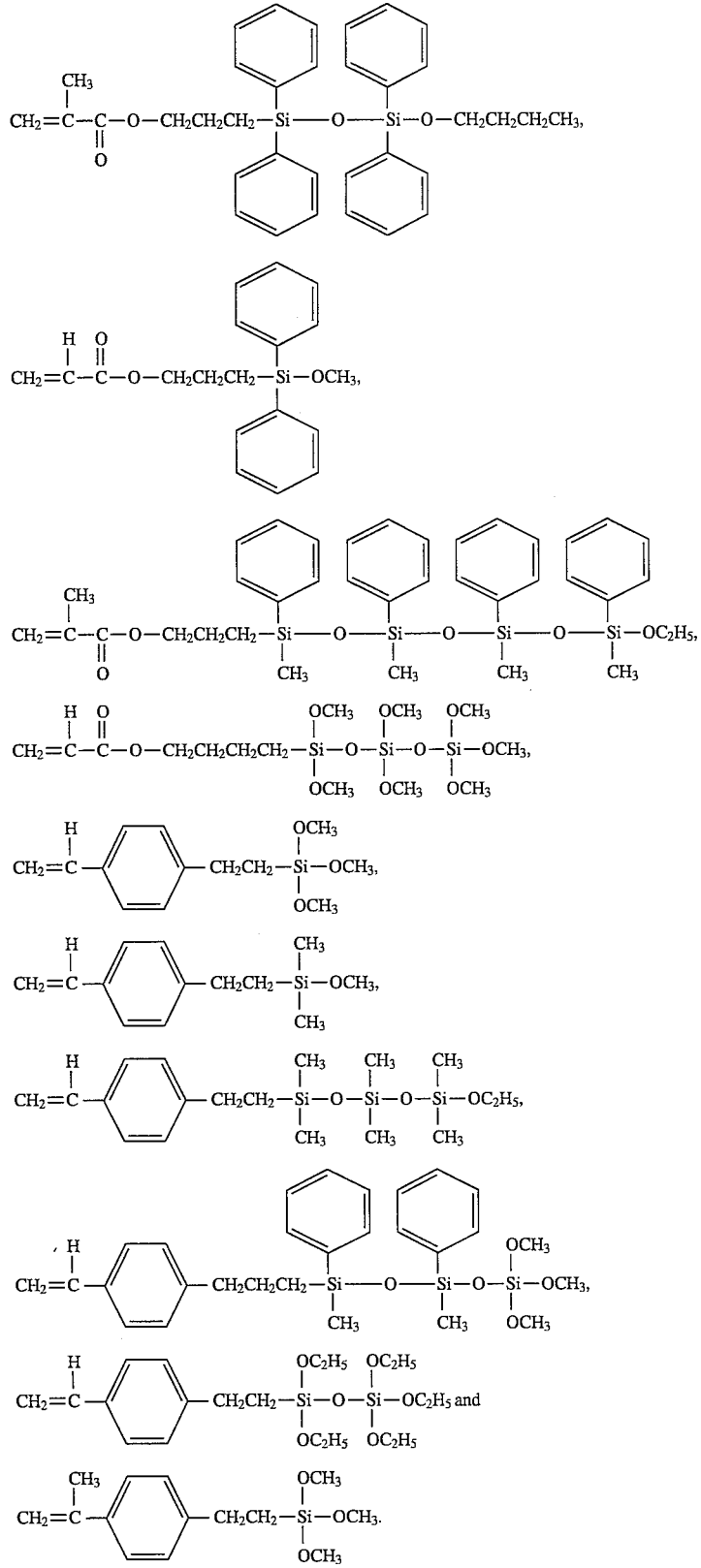

4. A composition of claim 1 in which the alkoxysilane-containing vinyl monomer is selected from the group consisting of acryloxypropyl trimethoxysilane, methacryloxypropyl trimethoxysilane, methacryloxypropyl triethoxysilane, methacryloxypropyl tri-n-butoxysilane, acryloxypropyl methyldimethoxysilane, methacryloxypropyl methyldimethoxysilane and methacryloxypropylmethyl di-n-butoxysilane.

5. A composition of claim 1 in which the carboxyl-containing unsaturated monomer is a compound having 1 or 2 carboxyl groups and 1 polymerizable unsaturated bond per molecule.

6. A composition of claim 1 in which the carboxyl-containing unsaturated monomer is selected from the group consisting of (meth)acrylic acid, crotonic acid, maleic acid, maleic anhydride, itaconic acid, itaconic anhydride, fumaric acid and citraconic acid.

7. A composition of claim 1 in which the carboxyl-containing unsaturated monomer is (meth)acrylic acid.

8. A composition of claim 1 in which the hydroxyl-containing unsaturated monomer is a compound having 1 or 2 hydroxyl groups and 1 polymerizable unsaturated bond per molecule.

9. A composition of claim 1 in which the hydroxyl-containing unsaturated monomer is selected from the group consisting of $C_2$–$C_8$ hydroxyalkyl esters of (meth)acrylic acid, monoethers of polyetherpolyols and 2-hydroxyethyl (meth)acrylate, adducts of 1 mol of hydroxyl-containing (meth)acrylic acid ester with 1–5 mols of lactones, adducts of $\alpha,\beta$-unsaturated carboxylic acids with monoepoxy compounds, adducts of glycidyl (meth)acrylate and monobasic acids, mono- or di-esters of acid anhydride group-containing unsaturated compounds and glycols, hydroxyalkyl vinyl ethers, 3-chloro-2-hydroxypropyl (meth)acrylate and allyl alcohol.

10. A composition of claim 1 in which the hydroxyl-containing unsaturated monomer is a $C_2$–$C_8$ hydroxyalkyl ester of (meth)acrylic acid.

11. A composition of claim 1 in which the alkoxysilane-containing vinyl monomer is used in an amount of 3–50% by weight based on the total sum of all the monomers used.

12. A composition of claim 1 in which the water-dispersible acrylic copolymer (A) has an acid value ranging 40–120 and a hydroxyl value ranging 15–150.

13. A composition of claim 1 in which other polymerizable monomer or monomers are used in an amount of 85–30% by weight based on the total sum of all the monomers used.

14. A composition of claim 1 in which the acrylic copolymer (A) has a number average molecular weight ranging from about 1,000 to about 60,000.

15. A composition of claim 1 in which the acrylic copolymer (A) is obtained through solution polymerization.

16. A composition of claim 1 in which the acrylic copolymer (A) is in the form of an aqueous dispersion.

17. A composition of claim 16 in which the aqueous dispersion has a solid resin concentration ranging from about 1 to about 70% by weight.

18. A composition of claim 16 in which the dispersed acrylic copolymer (A) in the aqueous dispersion has an average particle diameter ranging from about 0.01 to about 1 µm.

19. A composition of claim 1 in which the polyisocyanate (B) is selected from the group consisting of aliphatic diisocyanates, ring-containing aliphatic diisocyanates and terminal isocyanate group-containing compounds obtained through reactions of such polyisocyanate compounds with low molecular weight, active hydrogen-containing compounds, and biuret-type adducts and isocyanuric ring-type adducts of these polyisocyanate compounds.

20. A composition of claim 1 in which the polyisocyanate (B) is a biuret-type adduct of hexamethylene diisocyanate or an isocyanuric ring-type adduct of hexamethylene diisocyanate.

21. A composition of claim 1 in which the polyisocyanate (B) is in the form of a mixture with organic liquid.

22. A composition of claim 1, which is used by combining the first pack component and the second pack component at such a ratio that hydroxyl groups in the acrylic copolymer (A) to isocyanate groups of the polyisocyanate (B) is 0.5:1 to 2:1 in terms of NCO:OH equivalent ratio.

23. A composition of claim 1, which is used by combining the first pack component and the second pack component at such a ratio that hydroxyl groups in the acrylic copolymer (A) to isocyanate groups of the polyisocyanate (B) is 0.2:1 to 3:1 in terms of NCO:OH equivalent ratio.

24. A composition of claim 1, which further comprises an extender, coloring pigment, metallic pigment, dye, thickener, curing catalyst, ultraviolet absorber, antioxidant, anti-algae agent, antimolding agent, sterilizer, or defoaming agent.

25. A composition of claim 1, which is a paint, adhesive, ink or surface-treating agent.

26. A two-pack aqueous coating composition comprising:

(A) a first pack component comprising an aqueous dispersion of a water-dispersible acrylic copolymer having an acid value of 20–150 and a hydroxyl value of 10–250, which copolymer comprises (1) 1–90% by weight, based on the total weight of all monomers in said copolymer, of at least one alkoxysilane-containing vinyl monomer represented by the formula (I):

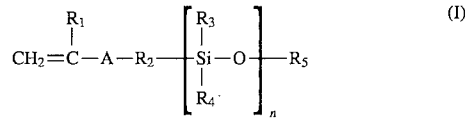

in which A denotes

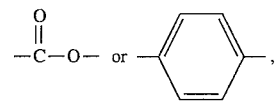

$R_1$ denotes hydrogen atom or methyl group, $R_2$ denotes a divalent aliphatic saturated hydrocarbon group having 1–15 carbon atoms, $R_3$ and $R_4$ each denotes phenyl, alkyl having 1–6 carbon atoms or alkoxy having 1–10 carbon atoms, $R_5$ denotes an alkyl of 1–10 carbon atoms, and n is an integer of 1–100, with (2) at least one carboxyl-containing unsaturated monomer, and (3) and at least one hydroxyl-containing unsaturated monomer, and (B) the second pack component comprising a polyisocyanate containing at least two isocyanate groups.

* * * * *